United States Patent
Campbell et al.

(10) Patent No.: US 10,817,336 B2
(45) Date of Patent: Oct. 27, 2020

(54) APPARATUS AND METHOD TO SCHEDULE TIME-SENSITIVE TASKS

(71) Applicant: ARM LIMITED, Cambridge (GB)

(72) Inventors: Michael Andrew Campbell, Waterbeach (GB); Fergus Wilson MacGarry, Cambridge (GB); Bruce James Mathewson, Papworth Everard (GB)

(73) Assignee: ARM Limited, Cambridge (GB)

( * ) Notice: Subject to any disclaimer, the term of this patent is extended or adjusted under 35 U.S.C. 154(b) by 218 days.

(21) Appl. No.: 15/194,928

(22) Filed: Jun. 28, 2016

(65) Prior Publication Data

US 2017/0031713 A1 Feb. 2, 2017

(30) Foreign Application Priority Data

Jul. 29, 2015 (GB) .................................. 1513367.1

(51) Int. Cl.
*G06F 9/48* (2006.01)
(52) U.S. Cl.
CPC .......... *G06F 9/4887* (2013.01); *G06F 9/4881* (2013.01)
(58) Field of Classification Search
CPC .............................. G06F 9/4881; G06F 9/4887
USPC ........................................................ 718/103
See application file for complete search history.

(56) References Cited

U.S. PATENT DOCUMENTS

| 6,263,411 B1 * | 7/2001 | Kamel | H04N 21/2182 348/E5.008 |
| 6,871,011 B1 * | 3/2005 | Rahman | G06F 3/0611 348/E5.008 |
| 8,539,493 B1 * | 9/2013 | Robertson | G06F 9/4881 718/103 |
| 2002/0083117 A1 * | 6/2002 | Goddard | H04L 29/06 718/103 |
| 2003/0149604 A1 * | 8/2003 | Casati | G06Q 10/063 705/7.22 |
| 2003/0225644 A1 * | 12/2003 | Casati | G06Q 20/10 705/35 |
| 2007/0255850 A1 * | 11/2007 | Gould | G08G 5/0026 709/240 |
| 2007/0281743 A1 * | 12/2007 | Palin | H04B 1/406 455/557 |
| 2008/0028415 A1 * | 1/2008 | Binns | G06F 9/4887 718/107 |

(Continued)

OTHER PUBLICATIONS

Combined Search and Examination Report for GB 1513367.1, dated Feb. 26, 2016 and Feb. 17, 2016, 8 pages.

(Continued)

*Primary Examiner* — Meng Ai T An
*Assistant Examiner* — Willy W Huaracha
(74) *Attorney, Agent, or Firm* — Nixon & Vanderhye P.C.

(57) ABSTRACT

There is provided an apparatus comprising scheduling circuitry, which selects a task as a selected task to be performed from a plurality of queued tasks, each having an associated priority, in dependence on the associated priority of each queued task. Escalating circuitry increases the associated priority of each of the plurality of queued tasks after a period of time. The plurality of queued tasks comprises a time-sensitive task having an associated deadline and in response to the associated deadline being reached, the scheduling circuitry selects the time-sensitive task as the selected task to be performed.

15 Claims, 7 Drawing Sheets

(56) References Cited

U.S. PATENT DOCUMENTS

| | | | |
|---|---|---|---|
| 2008/0139898 A1* | 6/2008 | Johnson | A61B 5/0002 600/301 |
| 2009/0006403 A1* | 1/2009 | McKenney | G06F 9/4831 |
| 2009/0100433 A1* | 4/2009 | Kang | G06F 3/061 718/103 |
| 2009/0183162 A1 | 7/2009 | Kindel et al. | |
| 2010/0011149 A1* | 1/2010 | Molaro | G06F 3/0613 711/103 |
| 2015/0074674 A1 | 3/2015 | Ma et al. | |
| 2016/0239441 A1* | 8/2016 | Chun | G06F 13/18 |

OTHER PUBLICATIONS

[Online] "Scheduling (computing)" Wikipedia article, dated Jun. 30, 2015, 12 pages.

[Online] "Fixed-priority pre-emptive scheduling", Wikipedia article, dated Apr. 22, 2015, 1 page.

Stuecheli et al., "Elastic Refresh: Techniques to Mitigate Refresh Penalties in High Density Memory", Proceedings of the 2010 43rd Annual IEEE/ACM International Symposium on Microarchitecture, Dec. 4, 2010, pp. 375-384.

* cited by examiner

| Qs = 1<br>Task = 11 | Qs = 5<br>Task = 12 | Qs = 5<br>Task = 10 | Qs = 7<br>Deadline = 10<br>Duration = 5<br>Task = 15 | Qs = 7<br>Task = 14 | Qs = 9<br>Deadline = 50<br>Duration = 40<br>Task = 13 |

FIG. 5

APPARATUS AND METHOD TO SCHEDULE TIME-SENSITIVE TASKS

This application claims priority to GB Patent Application No. 1513367.1 filed 29 Jul. 2015, the entire contents of which is hereby incorporated by reference.

The present technique relates to the field of data processing, particularly the field of task scheduling.

It has been previously proposed to use a scheduler to select a task to be performed from a plurality of queued tasks. When time-sensitive tasks must be performed, scheduling becomes more difficult. In particular, if a time-sensitive task occupies a particular resource for an extended period of time, then it is desirable to schedule the time-sensitive task so that the impact on other tasks is limited. However, it is also undesirable to excessively delay the time-sensitive task since, being time-sensitive, its delay may affect performance of the system.

Viewed from a first example configuration, there is provided an apparatus comprising: scheduling circuitry to select a task as a selected task to be performed from a plurality of queued tasks, each having an associated priority, in dependence on the associated priority of each queued task; and escalating circuitry to increase the associated priority of each of the plurality of queued tasks after a period of time, wherein the plurality of queued tasks comprises a time-sensitive task having an associated deadline; and in response to the associated deadline being reached, the scheduling circuitry selects the time-sensitive task as the selected task to be performed.

Viewed from a second example configuration, there is provided a method comprising: selecting a task as a selected task to be performed from a plurality of queued tasks, each having an associated priority, in dependence on the associated priority of each queued task; and increasing the associated priority of each of the plurality of queued tasks after a period of time, wherein the plurality of queued tasks comprises a time-sensitive task having an associated deadline; and in response to the associated deadline being reached, selecting the time-sensitive task as the selected task to be performed.

Viewed from a third example configuration, there is provided an apparatus comprising: scheduling means for selecting a task as a selected task to be performed from a plurality of queued tasks, each having an associated priority, in dependence on the associated priority of each queued task; and escalating means for increasing the associated priority of each of the plurality of queued tasks after a period of time, wherein the plurality of queued tasks comprises a time-sensitive task having an associated deadline; and in response to the associated deadline being reached, the scheduling means selects the time-sensitive task as the selected task to be performed.

The present technique will be described further, by way of example only, with reference to embodiments thereof as illustrated in the accompanying drawings, in which:

FIG. 5 illustrates, the pre-selection of a time-sensitive task in based on the estimated duration of a higher priority time-sensitive task;

Figure 1:
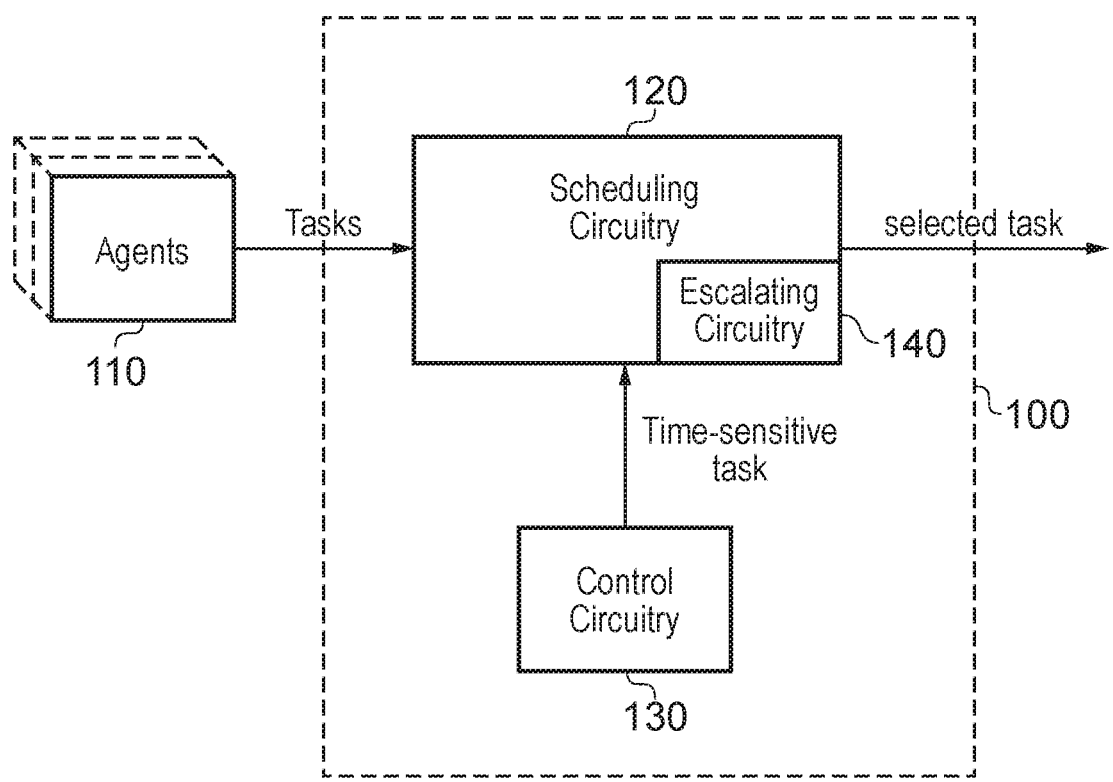
FIG. 1 illustrates, schematically, an apparatus in accordance with one embodiment.

Before discussing the embodiments with reference to the accompanying Figures, the following description of embodiments and associated advantages is provided.

In accordance with one example configuration there is provided an apparatus comprising: scheduling circuitry to select a task as a selected task to be performed from a plurality of queued tasks, each having an associated priority, in dependence on the associated priority of each queued task; and escalating circuitry to increase the associated priority of each of the plurality of queued tasks after a period of time, wherein the plurality of queued tasks comprises a time-sensitive task having an associated deadline; and in response to the associated deadline being reached, the scheduling circuitry selects the time-sensitive task as the selected task to be performed.

In accordance with the above, the plurality of tasks are held within a queue and ordered, for example, by their associated priority. Throughout this description, the term "priority" is used to refer a relative importance of a task and not any priority level (numeric or otherwise) being used to represent that importance. The task to be performed next is selected based on the associated priority of each task. For example, if the tasks are stored in a queue and ordered by priority then the head of the queue will be the task having the highest priority and this task is selected as the next task to be performed. After a period of time, the associated priority of each queued task is increased by the escalating circuitry. A task's associated priority is therefore increased by virtue of being in the queue before this period of time elapses. This escalation helps to ensure that tasks remain in the queue for a finite period of time. However, it does not occur at the cost of time-sensitive tasks because if the deadline of a time-sensitive task is reached, that task is selected as the task to be performed. Accordingly, the time-sensitive nature of a time-sensitive task is respected.

In some embodiments, the scheduling circuitry selects the time-sensitive task as the selected task to be performed by increasing the associated priority of the time-sensitive task. Since the scheduling circuitry selects a task in dependence on the associated priority of that task, the time-sensitive task is more likely to be selected.

There are a number of ways in which the associated priority of the time-sensitive task may be increased. However, in some embodiments, the scheduling circuitry selects the time-sensitive task as the selected task to be performed by increasing the associated priority of the time-sensitive task to a maximum priority. Since the selection of the task is made in dependence on the associated priority of the task, increasing the associated priority of the time-sensitive task to a maximum priority increases the likelihood that the time-sensitive task will be selected to be performed.

In some embodiments, the scheduling circuitry selects a task with a highest associated priority from the plurality of queued tasks as the selected task. Accordingly, more important (higher priority) tasks are selected to be performed in preference to less important (lower priority) tasks. In some embodiments, tasks having the same associated priority maintain a relative ordering between them. This ordering could, for example, be established based on the order in which each task acquired that same priority. In these embodiments, the scheduling circuitry will therefore select the task at the end of a queue of tasks ordered by priority (for example, at the head of the queue).

In some embodiments, in response to receiving a new task, the apparatus is configured to add the new task to the plurality of queued tasks. The position of the new task in the plurality of queued tasks may be based on the associated priority of the new task. New tasks that are added to the plurality of queued tasks will not have had their priority increased by the escalating circuitry. Accordingly, tasks that were previously added to the plurality of queued tasks and that originally had the same priority as the new task could have a higher priority than the new task due to their priority having been increased by the escalating circuitry. This mechanism helps to ensure that older tasks are given higher priorities, which helps to prevent tasks from waiting to be performed forever.

There are a number of ways in which the escalating circuitry may determine when to increase the associated priority of each of the plurality of queued tasks. In some embodiments, the escalating circuitry is to increase the associated priority of each of the plurality of queued tasks every period of time. Accordingly, over time, lower priority tasks will continually increase in priority regardless of how many tasks are actually performed. In some other embodiments, the escalating circuitry is to increase the associated priority of each of the plurality of queued tasks in response to the scheduling circuitry selecting a task as the selected task a predefined number of times. Accordingly, over time, lower priority tasks will continually increase in priority. However, this will only occur as tasks are performed. Accordingly, this may help to prevent the situation in which the relative priority between tasks is lost due to some tasks reaching the highest priority (at which point their associated priority cannot be increased further) while other tasks continue to have their priority increased.

In some embodiments, the plurality of queued tasks comprises a higher priority time-sensitive task and a lower priority time sensitive task, each having an associated deadline; and the apparatus comprises compensation circuitry to bring forward the associated deadline of the lower priority time-sensitive task in response to a duration of the higher priority time-sensitive task being such that performing the higher priority time-sensitive task will cause the associated duration of the lower priority time-sensitive task to be reached. Accordingly, when a higher priority time-sensitive task is due to be performed, the apparatus may firstly determine whether or not there is any other lower priority time-sensitive task that may over-run (its deadline will be reached) during performance of the higher priority task as a result. This is calculated based on the associated duration of the higher priority task and the deadline of the lower priority task. If there is such a task, then the compensation circuitry causes the lower priority time-sensitive task's deadline to be brought forward. The deadline is brought forward such that it is reached. This causes the lower priority time-sensitive task to be selected to be performed. Accordingly, the lower priority time-sensitive task is selected over the higher priority time-sensitive task. Consequently, the deadline of the lower priority time-sensitive task will not expire during performance of the higher priority time-sensitive task.

In some embodiments, the compensation circuitry brings forward the associated deadline of the lower priority time-sensitive task on the condition that a duration of the lower priority time-sensitive task is such that performing the lower priority time-sensitive task will cause the associated deadline of the higher priority time-sensitive task to be unreached. Accordingly, in these embodiments, the compensation circuitry will only cause the lower priority time-sensitive task to be performed in preference to the higher priority time-sensitive task if the deadline of the higher priority time-sensitive task is not reached. The compensation circuitry will not, therefore, avoid missing the deadline of the lower priority time-sensitive task at the expense of the higher priority time-sensitive task's deadline being missed.

In some embodiments, the duration is an estimated duration. Accordingly, it may be possible to determine or estimate whether or not lower priority time-sensitive tasks will unnecessarily over-run based on an estimate of the time taken for another task to be performed.

In some embodiments, the apparatus is a dynamic memory controller. The dynamic memory controller may, for example, control the interaction with and manage ranks of memory banks.

In some embodiments, the apparatus is a non-volatile memory controller. Accordingly, the apparatus may control the interaction with and manage areas of non-volatile memory.

In some embodiments, the time-sensitive task is a maintenance operation. Often it is necessary to perform a maintenance operation in order to ensure that a particular device works correctly. This may include house-keeping operations, control operations, or operations that are necessary in order to prevent errors. For example, the time sensitive task may be a DRAM refresh operation. This may be performed on DRAM memory in order to refresh the contents thereby helping to prevent the contents from being lost. Another example of such a maintenance operation may be a training operation such as a PHY training operation. Analog circuits may, over time, get out of phase due to drift. A training operation such as that performed by the PHY of a memory interface circuit may be performed in order to correct the phase.

In some embodiments, the apparatus is a radio. In such cases, the tasks may be, for example, radio transmissions. Time-sensitive tasks may be control transmissions that must be transmitted to advertise the presence of a device or to provide a schedule for multiplexing, for example.

In some embodiments, the apparatus comprises storage circuitry to store, for each task in the plurality of queued tasks, a priority level representing the associated priority of that task, wherein the escalating circuitry increases the associated priority of each of the plurality of queued tasks by changing the priority level of that task in a first direction. Priority may be represented as a priority level in many different ways. For example, the highest priority may have a low numeric priority level and the lowest priority may have a high numeric priority level. When the associated priority of a task is increased, therefore, the priority level is changed in a first direction (e.g. decreased). The skilled person will appreciate, of course, that the reverse representation is equally acceptable and that this will result in the priority level being increased as a consequence of the priority increasing.

Particular embodiments will now be described with reference to the Figures.

FIG. 1 schematically illustrates an apparatus 100 in accordance with one embodiment. One or more agents 110 issue tasks to a scheduling circuitry 120 of the apparatus 100. In this embodiment, a task is an operation to be performed. For example, a task could be a unit of processing to be executed, or could be a data packet to be transmitted by a radio. It could also be a request to a dynamic memory controller or non-volatile memory controller. In any event, the tasks are submitted to the scheduling circuitry 120 which is responsible for determining which task is selected to be performed next.

The scheduling circuitry 120 also receives time-sensitive tasks from control circuitry 130. The time-sensitive tasks are, similarly, operations to be performed, but the operations in question must be performed within a particular period of time. Such tasks, if performed late, may be invalid or may even affect the performance of the overall system. In extreme cases, performing time-sensitive tasks late may cause the system to fail. The time-sensitive tasks are received by the scheduling circuitry 120 and are also taken into account in determining the task that is to be performed next.

Each of the tasks that are submitted to the scheduling circuitry 120 has an associated priority. The task that is selected by the scheduling circuitry 120 to be performed next is selected based on the priority associated with each of the tasks submitted to the scheduling circuitry 120. The scheduling circuitry 120 also comprises escalating circuitry 140. The escalating circuity 140 increases the associated priority of each of the tasks submitted to the scheduling circuitry 120 after a period of time. The period of time may be predetermined and may also be repetitive. In this way, the priority of each task being considered by the scheduling circuitry 120 will increase over time. In other embodiments, the escalating circuitry 140 increases the associated priority of each of the tasks after selecting a predetermined number of tasks. This may also be repetitive.

The tasks being considered by the scheduling circuitry 120 (i.e. those tasks that have been submitted to the scheduling circuitry 120 and not yet selected), form part of a queue. The queue is ordered based on the associated priority of each of the tasks in question. Increasing the associated priority of a single task therefore causes that task to move forward in the queue. Increasing the priority of each task in the queue in a constant manner would, of course, not affect the order in which each task is held within the queue. In any event, the selected task may be selected by merely 'popping' the head of the queue, i.e. retrieving the task and removing it from the queue.

In the above embodiment, if the deadline associated with a time-sensitive task is reached, then the scheduling circuitry 120 causes that time-sensitive task to be selected as the task to be performed. In this embodiment, this is achieved by increasing the associated priority of the time-sensitive task to a maximum priority. Hence, such a task will change position so that it is at the head of the queue and will thereby be selected as the task to be performed next.

In the above embodiment, the control circuitry 130 forms part of the apparatus 100. However, in other embodiments, the apparatus may only comprise the scheduling circuitry 120.

Figure 2:
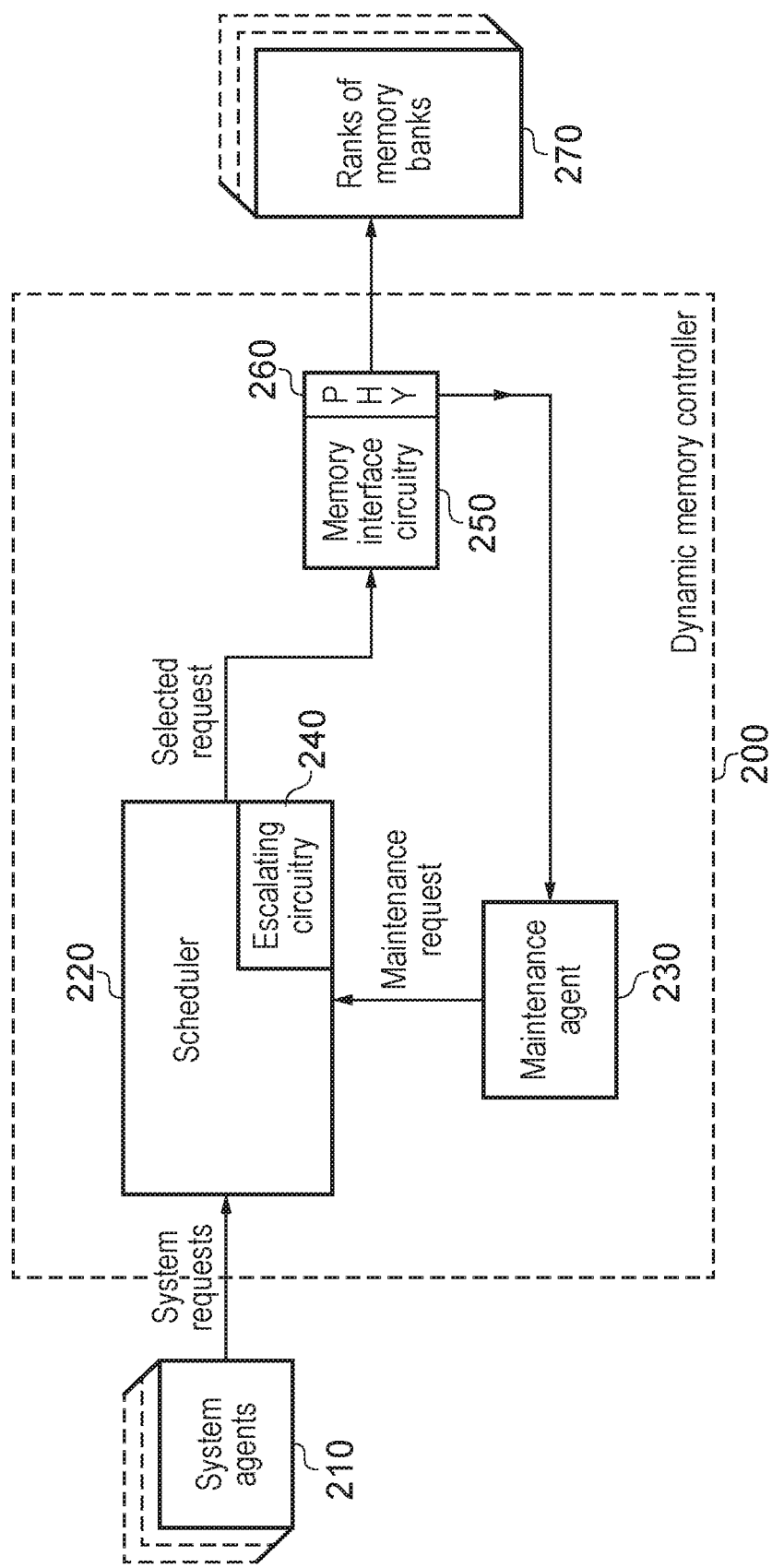
FIG. 2 illustrates, schematically, an apparatus performing as a dynamic memory controller in accordance with one embodiment.

FIG. 2 schematically illustrates a dynamic memory controller 200 in accordance with one embodiment. In the embodiment shown in FIG. 2, one or more system agents 210 (which are examples of the agents 110 in the embodiment of FIG. 1) issue system requests (an example of tasks) to a scheduler 220 (which is an example of scheduling circuitry 120). A maintenance agent 230 (which is an example of control circuitry 130) is responsible for issuing maintenance requests to the scheduler 220. In a dynamic memory controller, maintenance requests are performed in order to refresh the memory 270 periodically, for example. These requests are time-sensitive since if the memory does not get refreshed sufficiently frequently, then the contents of the memory 270 can be lost. However, a DRAM refresh can take a period of time to be performed, and during this time, it is not be possible to access the memory 270. Accordingly, the maintenance requests must be scheduled having regard to their time-sensitive nature, but must also be scheduled having regard to the other system requests issued by the system agent 210, which may themselves be high priority. This process becomes particularity complicated if the system requests issued by the system agents 210 are issued uniformly randomly, for example, if the system requests issued by the system agents 210 are not issued in a predictable manner.

When the scheduler 220 selects a particular request to be performed, that request is provided to memory interface circuitry 250, which is the circuitry that acts on the ranks of memory banks 270 themselves via a PHY 260. The PHY 260 is also responsible for indicating to the maintenance agent 230 that a maintenance operation must be performed.

The scheduler 220 and the escalating circuitry 240 work in a similar manner to the scheduling circuitry 120 and the escalating circuitry 140 illustrated in the embodiment of FIG. 1. Accordingly, the maintenance requests issued by maintenance agent 230 have their priority increased to a maximum priority when the deadline of the maintenance request is reached. This helps to ensure that the maintenance request deadlines are met and therefore that such maintenance requests may be given their own maximum bound for service. Similarly, the process in which the escalating circuitry 240 causes the priority of all requests queued in the scheduler 220 to increase (in this embodiment, every period) helps to ensure that system requests are not kept around forever as a consequence of maintenance requests being issued by the maintenance agent 230. In other words, the longer a request remains in the queue of the scheduler 220, the higher the priority of that request becomes. Accordingly, it becomes more and more likely, over time, that a particular request will be selected to be performed.

This process also makes it possible for system requests to be issued at high priority such that, in many cases, they will not be interrupted by abrupt maintenance requests. In particular, a newly inserted maintenance request may have a lower priority than a high priority system request. In this instance, unless the deadline of the maintenance request is reached, the high priority system request will be selected to be performed over the maintenance request.

Figure 3:
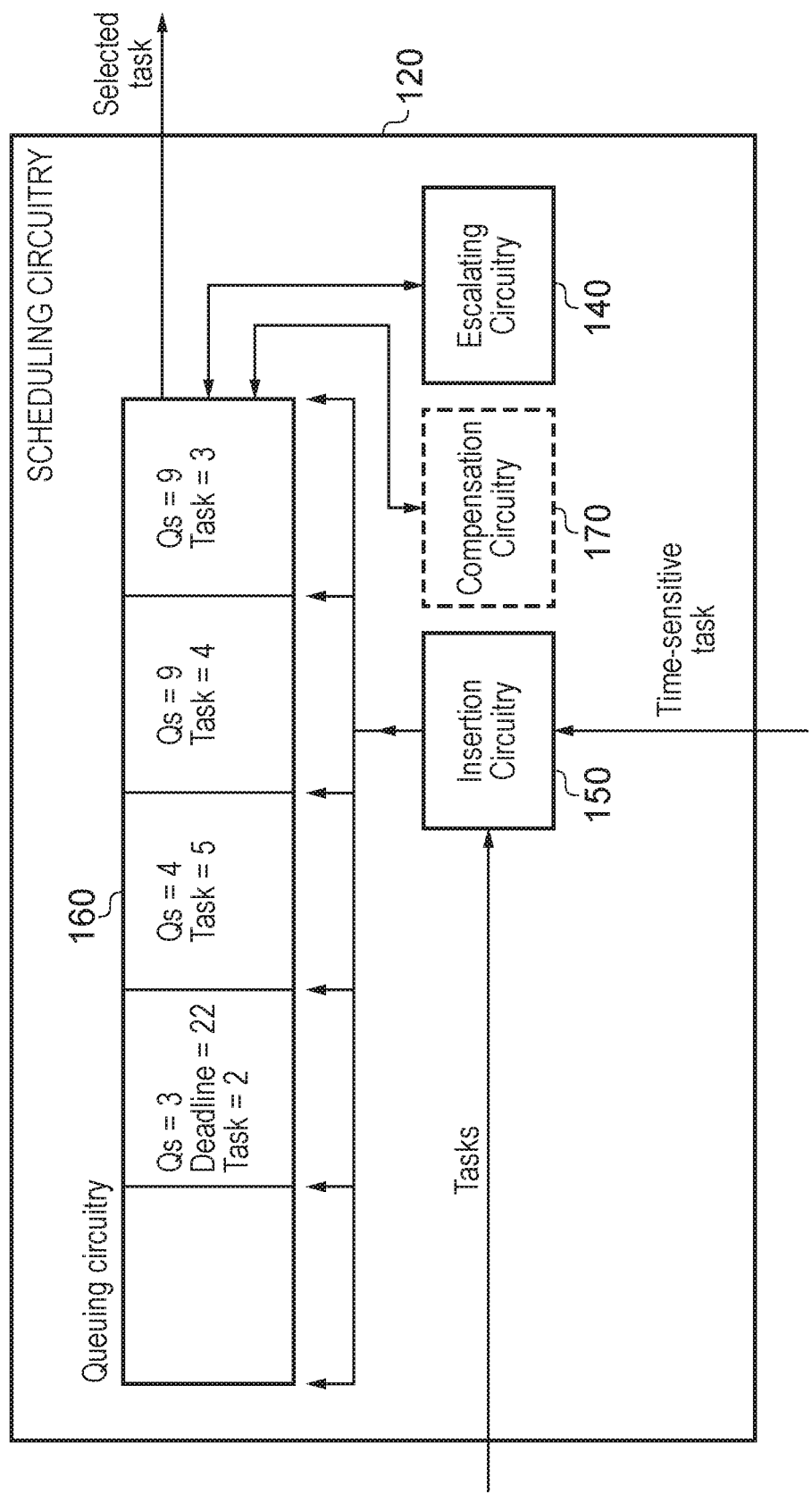
FIG. 3 illustrates, schematically, scheduling circuitry in accordance with one embodiment.

FIG. 3 illustrates an example of scheduling circuitry 120 in accordance with one embodiment. The scheduling circuitry 120 receives tasks and time-sensitive tasks at insertion circuitry 150. The insertion circuitry 150 is responsible for inserting tasks into the queuing circuitry 160. The location at which a task is inserted into the queue is, in this embodiment, dependant on the priority associated with that task. For example, higher priority tasks are inserted nearer the front of the queue, whilst lower priority tasks are inserted towards the tail of the queue. Note that the queuing circuitry 160 need not store the actual task to be performed itself. Instead, the queuing circuitry 160 may store references to tasks to be performed, with the tasks themselves being stored elsewhere. In the embodiment shown in FIG. 3, the associated priority of each task is represented by a priority level ($Q_s$). In this embodiment, a lower priority level corresponds with a lower priority and vice versa. Accordingly, the task with the highest priority level is considered to be the most important (highest priority) task. The selected task may therefore be selected by merely 'popping' the head of the queue (the top entry in the queuing circuitry 160). The act of 'popping' the top entry causes that entry to be removed from the queue. As previously described, the escalating circuitry 140 increments the priority of each of the queued tasks each period of time. For example, task 5, which has a priority level of 4, will obtain a priority level of 5 after a first period of time has elapsed.

In this embodiment, a time-sensitive task (task 2) is shown in the queuing circuitry 160. At present, the deadline associated with task 2 is 22. In this embodiment, the deadline represents the amount of time remaining before the task's deadline is reached. It will be appreciated, however, that such information may be represented in a number of different ways. For example, the deadline stored with the task could be the value of a system clock at which the task deadline is considered to be reached. Alternatively, the deadline could be replaced with a "lifetime", which is incremented every period of time such that it corresponds with the amount of time that the task has been stored in the queue. This lifetime may be matched with a further number to indicate the point at which the deadline is considered to be reached. Other means of representing time-sensitivity may also be used. In any event, task 2 has not yet reached its deadline. Accordingly, task 2 is merely treated like any other task in the queuing circuitry 160.

Optional compensation circuitry 170 may also be present in the scheduling circuitry 120. The compensation circuitry 170 may be used to help prevent a time-sensitive task from unnecessarily overrunning due to a long higher-priority time-sensitive task whose deadline is not yet reached, being selected to be performed. An example of this will be shown with regards to FIG. 5.

Figure 4:
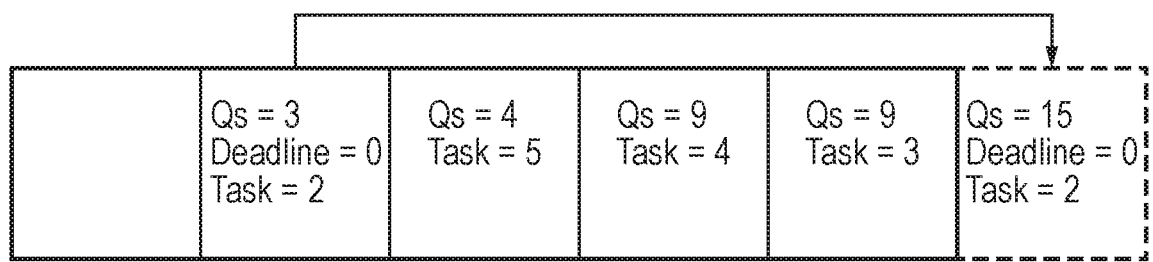
FIG. 4 illustrates, the "promotion" of a task whose deadline has expired, in accordance with one embodiment.

FIG. 4 illustrates the effect when a task deadline is reached. For example, taking the case of the queuing circuitry 160 shown in the embodiment of FIG. 3, when the deadline of task 2 is reached, its priority is increased to a maximum priority (represented by the priority level of 15). Accordingly, the task is moved to the front of the queue. Hence, next time a task is to be selected, task 2 will be selected as the task to be performed.

FIG. 5 illustrates an embodiment in which the duration of a task is considered using compensation circuitry 170. The duration may, for example, be an estimated duration. In this embodiment, task 13 would ordinarily be selected, since it has the highest priority. However, in this embodiment, the compensation circuitry 170 determines that if task 13 is to be performed, based on the estimated duration, task 15's deadline will be reached during performance of task 13. This is because the estimated duration of task 13 is 40 ms, whereas the deadline of task 15 will be reached in 10 ms. However, it is possible to perform task 15 prior to the deadline of task 13 being met. Accordingly, in this embodiment, the scheduling circuitry 120 causes the deadline of task 15 to be brought forward. Accordingly, the deadline of task 15 is met and, as per the previously described process, the priority of task 15 will be increased to a maximum priority. Accordingly, task 15 will be the next task to be selected, in place of task 13. Consequently, even though task 15 has a lower priority than task 13, the compensation circuitry 170 helps to prevent the situation in which the deadline of task 15 is passed unnecessarily merely to perform a higher priority task first.

Figure 6:
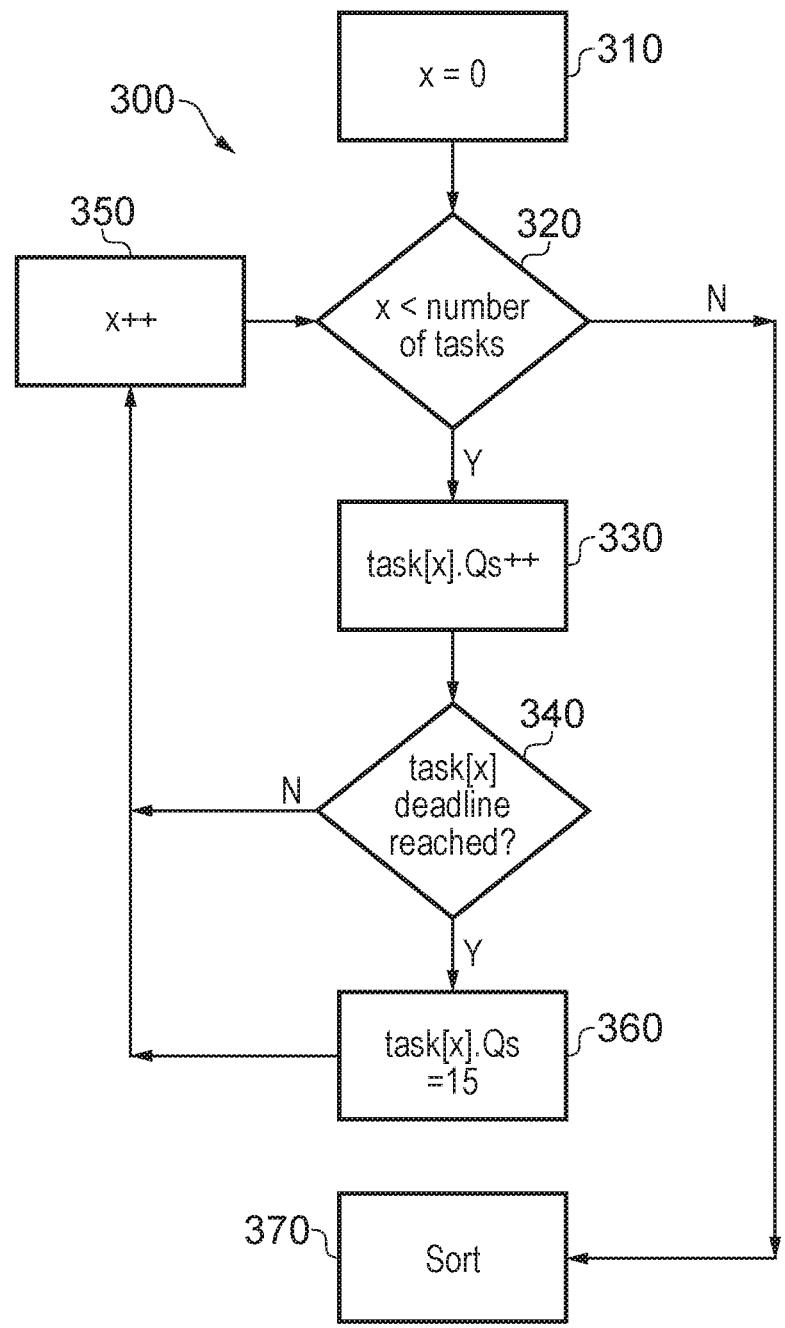
FIG. 6 illustrates, in flow-chart form, a method for managing the priority of tasks to be performed, in accordance with one embodiment.

FIG. 6 illustrates a flowchart 300 for performing a method in accordance with one embodiment. At step 310, a variable x is set to 0. At step 320, it is determined whether or not x is less than the number of tasks in the queuing circuitry 160. If not, then the process proceeds to step 370, where the tasks stored in the queuing circuitry 160 are sorted. For example, such sorting may take place on the basis of the priority associated with each task. Alternatively, if it is determined at step 320 that x is less than the number of tasks held in the queuing circuitry 160, then the priority level of task x is incremented by 1 (up to a maximum priority level) at step 330. At step 340, it is determined whether or not the deadline of task x has been reached. R not, then at step 350, x is incremented by 1, and the flow returns to step 320. Alternatively, if the deadline of task x has been reached, then the flow proceeds to step 360, where the priority level of task x is set to 15. In this embodiment, it is considered that a priority level of 15 is the maximum priority level. Flow then proceeds to step 350 where x is incremented by 1, before flow returns to step 320. Accordingly, by the virtue of steps 310, 320, and 350, a loop is implemented in which each of the tasks is iterated through. For each of the tasks, the priority level is incremented at step 330. Furthermore, if any of the task deadlines have been reached, then the priority level of that task is immediately increased to the maximum level of 15. The sorting process performed at step 370 is performed after all of the priority levels have been changed. In general, unless any of the task deadlines have been reached, no sorting actually need take place. In this embodiment, the sorting process performed at step 370 preserves the existing order for each task having the same priority level. For example, if a task's priority level is increased to 15 at step 360, then it will be placed behind any other tasks whose priority level is already 15. This process is aided if the iteration through each of the tasks occurs from head to tail. In other words, it is helped if the lower numbered tasks represent the head of the queue of tasks.

Figure 7:
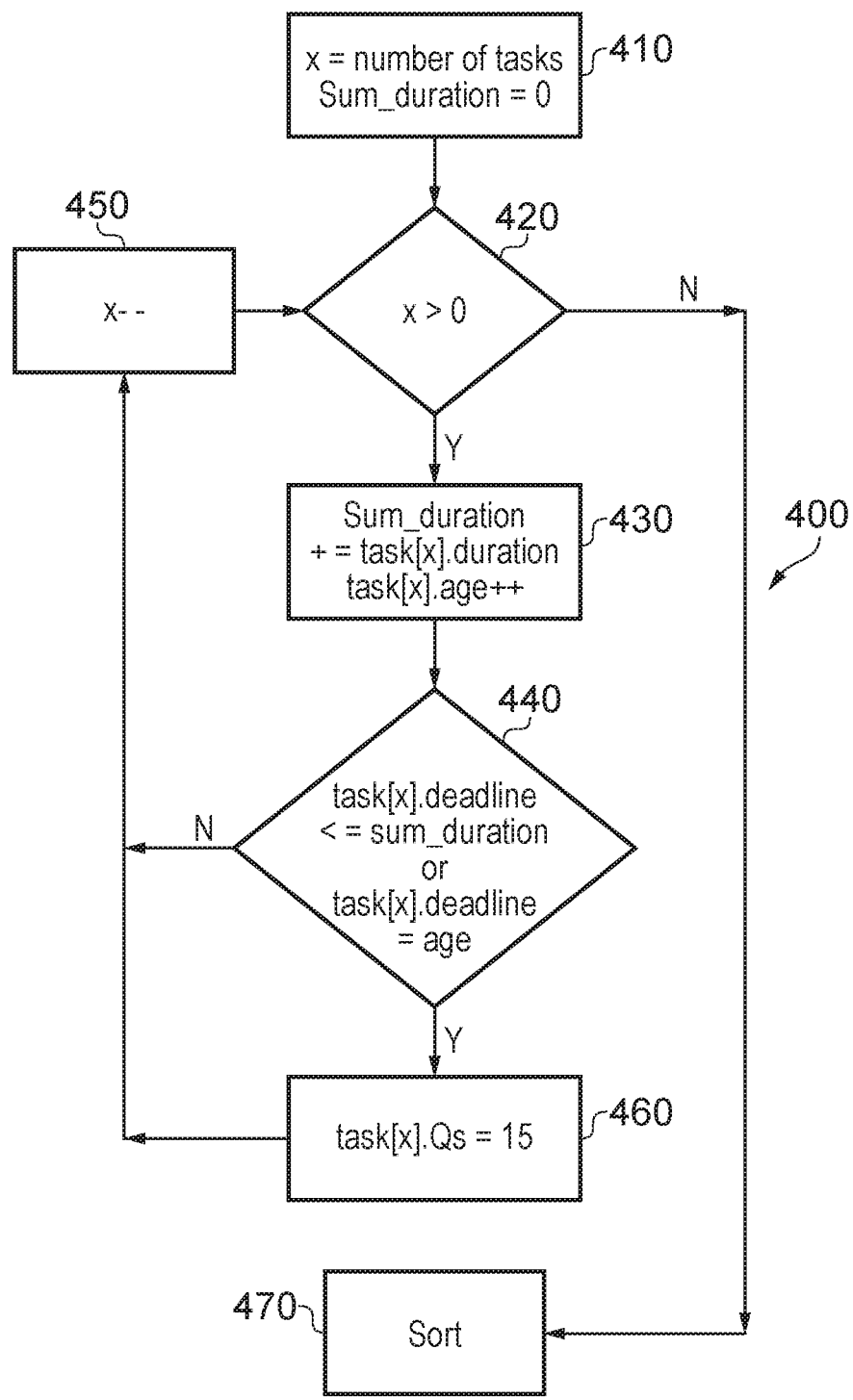
FIG. 7 illustrates, in flow-chart form, a further method for managing the priority of tasks to be performed, in accordance with one embodiment.

FIG. 7 illustrates a flowchart 400 for performing a method in accordance with one embodiment. This embodiment attempts to avoid the situation in which the deadline of a low priority task is missed as a consequence of a higher priority task (with a deadline further in the future) being selected to be performed. This embodiment uses a different representation of deadlines. In particular, the deadline of a task is fixed and, at each iteration, an age field associated with the task is incremented. The deadline field therefore represents the number of iterations (or selections) that may occur before the deadline is reached.

At step 410, a variable x is set to the number of tasks in the queuing circuitry 160. At step 420, it is determined whether or not x is greater than 0. If not, then the process proceeds to step 470, where the tasks stored in the queuing circuitry 160 are sorted. For example, such sorting may take place on the basis of the priority associated with each task. Alternatively, if it is determined at step 420 that x is greater than 0, then at step 430, the variable sum duration is incremented by the duration (which may be an estimated duration) of task x, and the age of task x is incremented by 1. The variable sum duration therefore represents a total of all durations encountered so far. At step 440, it is determined whether or not the deadline of task x has been reached (i.e. whether or not the age is equal to the deadline) or whether the deadline of task x is less than or equal to the variable sum duration. In other words, it is determined whether the deadline of task x is reached or if the deadline of task x is such that it has no chance to run before its deadline will be reached. If neither of these conditions is met then at step 450, x is decremented by 1, and the flow returns to step 420. Alternatively, if either of the conditions are met then flow proceeds to step 460, where the priority level of task x is set to 15. In this embodiment, it is considered that a priority level of 15 is the maximum priority level. Flow then proceeds to step 415 where x is decremented by 1, before flow returns to step 420. Accordingly, by the virtue of steps 410, 420, and 450, a loop is implemented in which each of the tasks is iterated through from the head of the queue (e.g. the task that is currently next to be executed) to the tail of the queue (e.g. the task that is currently last to be executed). If it is determined that the deadline of a task has been reached, or if the deadline is such that the deadline will be reached by the time that other tasks have been selected, then the task's priority will be immediately increased to the maximum level of 15, which is the highest level in this embodiment. In this embodiment, the priority of tasks is not incremented at each step. However, in other embodiments, the priority of tasks will increment by one at each iteration. The sorting process performed at step 470 is performed after all of the priority levels have been changed. In this embodiment, the sorting process performed at step 470 preserves the existing order for each task having the same priority level. For example, if a task's priority level is increased to 15 at step 460, then it will be placed behind any other tasks whose priority level is already 15.

It will be appreciated that the method described above could also be achieved in hardware in parallel. For example, for each entry in the queue, it is possible to determine and store an expected service time based on the task's position in the queue. For example, if a task has the fifth entry in the queue (from the head) and if a normal request's duration is 8 cycles, then the expected service time for that task would be 32 cycles ((5-1)*8)=32. Additionally, exceptional cases can also be considered. For example, a DRAM refresh task may take 50 cycles. If such a task is pending then the expected service time for later tasks may be increased appropriately. The scheduling circuitry can then determine whether a given task can tolerate the expected service time before the deadline for the task is reached.

Additionally, the promotion performed at step 460 could be reduced so that the task is only promoted so far in the queue as is required so that the task's deadline is less than or equal to the variable sum duration at that point in the queue. However, this would require the use of an iterative process in order to determine the most appropriate point in the queue, to insert the task.

A more lightweight alternative implementation is to sample task age at the point at which a task is selected and to track the average lifetime for each priority value. Real-time requests (with deadlines) can thereby be inserted to the queue on the basis of their deadline. The probability of a task's deadline being reached would therefore be reduced and so the promotion mechanism would be less likely to occur unnecessarily. The timeout mechanism in which a task is promoted if the deadline is reached would still be included and would catch outlying cases in which the deadline is still reached, despite the insertion point of a task having been selected. Such a mechanism would also be useful for a "context change" in which the average lifetime for each priority value must be re-determined. Additionally, the data of the average lifetime for each priority value can assist in dynamic/automated feedback to regulation systems, and/or for user analysis of scenarios.

Accordingly, it can be seen how the aforementioned apparatus and method can be used to reason about the maximum latency that will be experienced by a (time-sensitive) task. In particular, such reasoning may be possible where tasks are provided with uniform randomness. The aforementioned apparatus and method therefore makes it possible to implement an escalating priority system, such that tasks will eventually be performed, regardless of other high priority tasks that are added to the system. However, the embodiments described help to do this in such a way that time-sensitive tasks are not adversely affected.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus to schedule time-sensitive tasks comprising:
   insertion circuitry configured to receive and insert tasks into queuing circuitry according to a priority associated with each of the tasks, wherein the tasks include time-sensitive tasks;
   the queuing circuitry to maintain a plurality of queued tasks, each having an associated priority, wherein the plurality of queued tasks comprises a higher priority time-sensitive task and a lower priority time-sensitive task, each having an associated deadline and an associated estimated duration;
   scheduling circuitry to select a task as a selected task to be performed from the plurality of queued tasks, the scheduling circuitry being configured to select one of the queued tasks having a higher associated priority over another of the queued tasks having a lower associated priority,
   in response to the associated deadline of a given time-sensitive task being reached, the scheduling circuitry is configured to select the given time-sensitive task as the selected task to be performed;
   escalating circuitry to cause the associated priority of each of the plurality of queued tasks to increase either periodically, based on a predefined period of time, or in response to the scheduling circuitry selecting a task as the selected task a predefined number of times; and
   compensation circuitry configured to:
      detect, based on the estimated duration of the higher priority time-sensitive task and the associated deadline of the lower priority time-sensitive task, that performing the higher priority time-sensitive task to completion will cause the associated deadline of the lower priority time-sensitive task to be reached before the lower priority time-sensitive task is performed; and
      in response to the detecting, and upon further determination that performing the lower priority time-sensitive task before the higher priority time-sensitive task would not cause the associated deadline of the higher priority time-sensitive task to be reached, to increase the priority of the lower priority time-sensitive task to a maximum priority so that the lower priority time-sensitive task is performed before the associated deadline of the lower priority time-sensitive task is reached.

2. An apparatus according to claim 1, wherein
the scheduling circuitry is configured to select the time-sensitive task as the selected task to be performed by increasing the associated priority of the time-sensitive task.

3. An apparatus according to claim 1, wherein
the scheduling circuitry is configured to select a task with a highest associated priority from the plurality of queued tasks as the selected task.

4. An apparatus according to claim 1, wherein
in response to receiving a new task, the apparatus is configured to add the new task to the plurality of queued tasks.

5. An apparatus according to claim 1, wherein
the escalating circuitry is configured to increase the associated priority of each of the plurality of queued tasks every period of time.

6. An apparatus according to claim 1, wherein
the compensation circuitry is configured to bring forward the associated deadline of the lower priority time-sensitive task on the condition that a duration of the lower priority time-sensitive task is such that performing the lower priority time-sensitive task will cause the associated deadline of the higher priority time-sensitive task to be unreached.

7. An apparatus according to claim 1, wherein
the apparatus is a dynamic memory controller.

8. An apparatus according to claim 1, wherein
the apparatus is a non-volatile memory controller.

9. An apparatus according to claim 1, wherein
the time-sensitive task is a maintenance operation.

10. An apparatus according to claim 1, wherein
the time-sensitive task is a DRAM refresh operation.

11. An apparatus according to claim 1, wherein
the time-sensitive task is a PHY training operation.

12. An apparatus according to claim 1, wherein
the apparatus is a radio.

13. An apparatus according to claim 1, wherein:
the apparatus comprises storage circuitry to store, for each task in the plurality of queued tasks, a priority level representing the associated priority of that task, wherein
the escalating circuitry is configured to increase the associated priority of each of the plurality of queued tasks by changing the priority level of that task in a first direction.

14. A method to schedule time-sensitive tasks comprising:
receiving and inserting tasks into queuing circuitry according to a priority associated with each of the tasks, wherein the tasks include time-sensitive tasks;
selecting a task as a selected task to be performed from a plurality of queued tasks, each having an associated priority, wherein the plurality of queued tasks comprises a higher-priority time-sensitive task and a lower priority time-sensitive task, each having an associated deadline and an estimated duration, where one of the queued tasks having a higher associated priority is selected over another of the queued tasks having a lower associated priority,
wherein in response to the associated deadline of a given time-sensitive task being reached, the given time-sensitive task is selected as the selected task to be performed; and causing the associated priority of each of the plurality of queued tasks to increase either periodically, based on a predefined period of time, or in response to the scheduling circuitry selecting a task as the selected task a predefined number of times; and
detecting, based on the estimated duration of the higher priority time-sensitive task and the associated deadline of the lower priority time-sensitive task, that performing the higher priority time-sensitive task to completion will cause the associated deadline of the lower priority time-sensitive task to be reached before the lower priority time-sensitive task is performed, and
in response to the detecting, and upon further determination that performing the lower priority time-sensitive task before the higher priority time-sensitive task would not cause the associated deadline of the higher priority time-sensitive task to be reached, increasing the priority of the lower priority time-sensitive task to a maximum priority so that the lower priority time-sensitive task is performed before the associated deadline of the lower priority time-sensitive task is reached.

15. An apparatus to schedule time-sensitive tasks comprising:
means for receiving and inserting tasks into means for maintaining a plurality of queued tasks according to a priority associated with each of the tasks, wherein the tasks include time-sensitive tasks;
the means for maintaining a plurality of queued tasks, each having an associated priority, wherein the plurality of queued tasks comprises a higher priority time-sensitive task and a lower priority time-sensitive task, each having an associated deadline and an associated estimated duration;
means for selecting a task as a selected task to be performed from a plurality of queued tasks, said means for selecting being configured to select one of the queued tasks having a higher associated priority being selected over another of the queued tasks having a lower associated priority,
wherein in response to the associated deadline of a given time-sensitive task being reached, the means for selecting a task is configured to select the given time-sensitive task as the selected task to be performed;
means for causing the associated priority of each of the plurality of queued tasks to increase either periodically, based on a predefined period of time, or in response to the scheduling circuitry selecting a task as the selected task a predefined number of times; and
means for detecting, based on the estimated duration of the higher priority time-sensitive task and the associated deadline of the lower priority time-sensitive task, that performing the higher priority time-sensitive task to completion will cause the associated deadline of the lower priority time-sensitive task to be reached before the lower priority time-sensitive task is performed; and
means, in response to the means for detecting, for, upon further determination that performing the lower priority time-sensitive task before the higher priority time-sensitive task would not cause the associated deadline of the higher priority time-sensitive task to be reached, increasing the priority of the lower priority time-sensitive task to a maximum priority so that the lower priority time-sensitive task is performed before the associated deadline of the lower priority time-sensitive task is reached.

* * * * *